(12) United States Patent
Krishnamurthy et al.

(10) Patent No.: US 8,996,485 B1
(45) Date of Patent: Mar. 31, 2015

(54) WEB SITE VERIFICATION SERVICE

(75) Inventors: Sathvik Krishnamurthy, San Jose, CA (US); Guido Appenzeller, Menlo Park, CA (US); Matthew J. Pauker, San Francisco, CA (US); Lucas C. Ryan, San Francisco, CA (US); Terence Spies, San Mateo, CA (US)

(73) Assignee: Voltage Security, Inc., Cupertino, CA (US)

( * ) Notice: Subject to any disclaimer, the term of this patent is extended or adjusted under 35 U.S.C. 154(b) by 1882 days.

(21) Appl. No.: 11/085,360

(22) Filed: Mar. 21, 2005

Related U.S. Application Data (60) Provisional application No. 60/637,256, filed on Dec. 17, 2004.

(51) Int. Cl.
*G06F 7/00* (2006.01)
*G06F 21/30* (2013.01)

(52) U.S. Cl.
CPC ..................................... *G06F 21/30* (2013.01)
USPC ......................................................... 707/705

(58) Field of Classification Search
USPC ......................................................... 707/705
See application file for complete search history.

(56) References Cited

U.S. PATENT DOCUMENTS

| | | | |
|---|---|---|---|
| 6,173,406 B1 * | 1/2001 | Wang et al. | 726/3 |
| 6,957,199 B1 * | 10/2005 | Fisher | 705/78 |
| 7,167,985 B2 * | 1/2007 | Ahmed | 713/176 |
| 7,203,838 B1 * | 4/2007 | Glazer et al. | 713/176 |

OTHER PUBLICATIONS

U.S. Appl. No. 10/671,319, filed Sep. 24, 2003, Delany.
U.S. Appl. No. 10/805,181, filed Mar. 19, 2004, Delany.
Neil Chou et al. "Client-side defense against web-based identity theft", printed from internet at http://crypto.stanford.edu/SpoofGuard/webspoof.pdf.
Zoltan Gyongi et al., "Combating Web Spam with TrustRank," Mar. 1, 2004. Printed from internet.

* cited by examiner

*Primary Examiner* — Jacob F Bétit
*Assistant Examiner* — Fazlul Quader
(74) *Attorney, Agent, or Firm* — Treyz Law Group; G. Victor Treyz; David C. Kellogg (57) ABSTRACT

A user who is browsing the web may use a web site verification service to ascertain whether a web site that appears to be associated with a trusted entity is actually associated with that entity. The web site verification service retains the URL of an unauthenticated web site. The user types a text string naming the entity that the user believes should be associated with the web site into a text box. A database such as an internet search engine database or a database containing a list of trusted entities and their URLs may be queried using the user-supplied text string. The retained URL may be compared to the resulting list of URLs. If the retained URL does not match one of the URLs in the query results, the user may be warned that the web site does not appear to be associated with the trusted entity.

17 Claims, 7 Drawing Sheets

WEB SITE VERIFICATION SERVICE

This patent application claims the benefit of provisional patent application No. 60/637,256, filed Dec. 17, 2004, which is hereby incorporated by reference herein in its entirety.

BACKGROUND OF THE INVENTION

This invention relates to verifying the authenticity of web sites to help prevent fraud.

The world wide web is often used for sensitive transactions such as those involved in online banking and e-commerce. In a typical scenario, a user obtains access to an account at a financial institution by supplying a valid username and password.

The popularity of online services has given rise to fraud. One type of fraud, known as "phishing" involves sending fraudulent email messages to recipients to entice them to reveal their username and password or other sensitive information to an unauthorized party. Often the content of a fraudulent email is in html format and contains graphics and text that make the recipient believe that the fraudulent email was sent by a legitimate institution. For example, the fraudulent email may contain an accurate rendition of the logo of the recipient's bank.

The text of the fraudulent email may instruct the recipient to click on an embedded web link. When the recipient clicks on the web link, the recipient's web browser presents the recipient with a fraudulent web page that appears to be associated with the recipient's institution. The fraudulent web page generally contains the institution's logo and other content that makes the web page difficult or impossible to distinguish from a legitimate web page associated with the institution. The fraudulent web page also contains text that prompts the recipient to login to the institution by supplying appropriate credentials such as a username and password. When the recipient clicks on a login button on the fraudulent web page, the recipient's username and password are transmitted to the perpetrator of the fraud. The user credentials that have been fraudulently collected in this way may then be used to make unauthorized transactions at the recipient's institution.

It is therefore an object of the present invention to provide ways in which to help prevent fraud by verifying whether web sites are legitimate.

SUMMARY OF THE INVENTION

A web site verification service is provided that helps a user determine whether a web site that appears to be legitimate is authentic or is fraudulent.

As a user surfs the internet with a web browser, the user visits web sites and uploads data using web forms. Due to phishing attacks, some of the web sites may not be associated with legitimate businesses but rather may be fraudulent sites that are being used to trick the user into revealing sensitive personal information. With the web site verification service of the present invention, the user is provided with a text box or other on-screen opportunity to enter a text string naming the trusted entity with which the user believes the current web site is associated. For example, if the user is visiting a web site that the user believes is associated with a particular bank, the user can type the name of the bank into the text box.

The user-supplied text string naming the trusted entity is used to identify which universal resource locators (URLs) are legitimately associated with the trusted entity. This is accomplished by using the user-supplied text string to query a database. The database may be, for example, an internet search engine database. When search engine queries the database, the resulting top hits represent the most popular URLs associated with the text string. For example, if the user-supplied text string is the name of a bank, the database query results will include a list of URLs associated with that bank name. Because popular URLs are generally associated with legitimate businesses, the top search engine hits represent a list of legitimate URLs. The web site verification service may therefore ascertain whether the URL of the web site the user is visiting is legitimate by comparing the URL for the web site to the URLs in the database query results. If web site URL matches a URL in the query results, the web site is probably legitimate. If the web site URL does not match a URL in the query results, the URL is probably not legitimate. The user may be informed of the outcome of the web site verification process by displaying messages on the user's computer.

The user may be provided with the ability to adjust settings for the web site verification service. For example, the user can be provided with options that allow the user to adjust how many search engine hits are included in the database query results, options that dictate the conditions under which the text string entry box is displayed, options relating to how URL comparisons are made, and options related to caching prior web site verification results to improve performance.

Further features of the invention, its nature and various advantages will be more apparent from the accompanying drawings and the following detailed description of the preferred embodiments.

DETAILED DESCRIPTION OF THE PREFERRED EMBODIMENTS

The present invention relates to systems and methods for ascertaining whether a web site is legitimate or is fraudulent.

Figure 1:
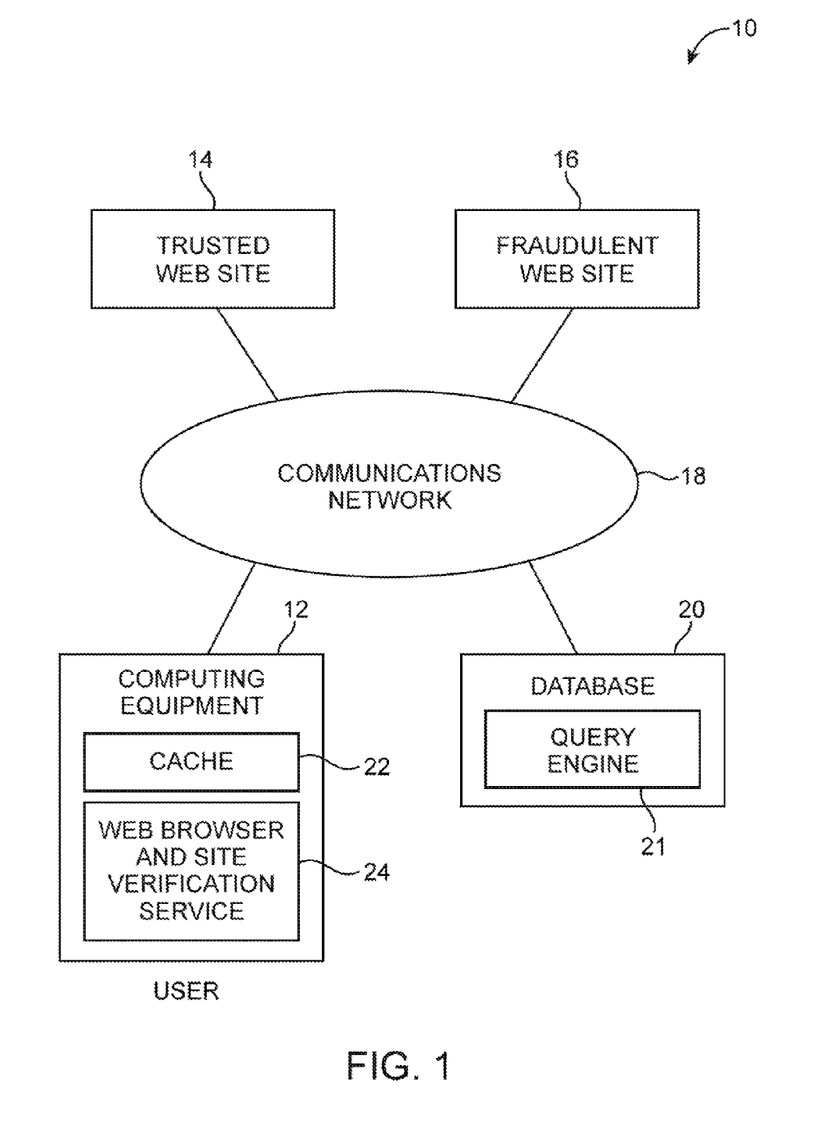
FIG. 1 is a diagram of an illustrative system in which web site authenticity can be verified in accordance with the present invention.

Web site authentication is performed by a web site verification service. An illustrative system environment in which the web site verification service may operate in accordance with the present invention is shown in FIG. 1. Users in system 10 have computing equipment 12. The computing equipment 12 may be used to access trusted web sites 14 and fraudulent web sites 16 over the communications network 18 (e.g., the internet). A database 20 contains information on which universal resource locators (URLs) are associated with particular organizations.

Computing equipment 12 may be a personal computer, a workstation, a portable computing device such as a handheld computer, laptop, cellular telephone, or any other suitable computing device or network of such devices. Web sites 14 and 16 and database 20 may be provided using one or more servers or using any other suitable computing equipment arrangement. There may be a one-to-one correspondence between web sites and servers in system 10 or web sites and database 20 may be provided using a distributed computing arrangement using multiple computers. When multiple computers are used to support website or database operations, the computers may be located at the same location or may be networked together using communications network 18. Network 18 may be any suitable wired and/or wireless network (e.g., the internet). Database 20 may be implemented using servers (e.g., when the database 20 includes an internet search engine database).

Computing equipment 12 may include a cache 22. Cache 22 may be implemented using memory and storage devices in computing equipment 12. Information such as the results of web site verification operations may be stored in cache 22. During subsequent site verification operations, the contents of cache 22 may be consulted to help determine whether a web site is authentic. Using cache 22 may reduce the computational burden that would otherwise be imposed on a system without cache capabilities and may therefore improve system performance.

The user at computing equipment 12 may use a web browser and web site verification service 24 to determine which web sites are legitimate. The web site verification service 24 may be implemented as part of a vendor-distributed browser, may be installed as a browser plug-in, or may be provided as a separate stand-alone application.

With the arrangement shown in FIG. 1, software for implementing service 24 is implemented on computing equipment 12 as a built-in browser component or as a browser plug-in. Database search operations may be implemented using a database query engine 21 running at database 20. Other software configurations may be used if desired. Regardless of the particular distribution of software used for performing site verification operations in system 10, the present discussion will generally refer to these operations as being performed by web site verification service 24 for clarity.

Trusted web sites that a user may visit may include financial institutions such as the user's bank. During a typical online banking transaction, the user enters username and password information into a web page (a web "form"). When the user clicks on a login button or other suitable on-screen option, the contents of the web form are uploaded to the user's bank at site 14. The user's bank authenticates the user by comparing the uploaded username and password information to account information stored at the bank. If the user's username and password match the bank's account records, the user is permitted to access the user's bank account. The user may then withdraw and transfer funds and perform other financial transactions.

Effective security in this type of system is dependent on the user guarding the secrecy of the username and password information. If the user can be tricked into revealing the username and password information to an unauthorized party, the unauthorized party may obtain access to the user's bank account.

One type of attack that may be used to attempt to trick the user into revealing the sensitive information such as username and password credentials is the so-called phishing attack. With a phishing attack, an attacker attempts to trick a user into revealing the user's secret information by masquerading as a trusted entity such as the user's bank. For example, the attacker may send an email to the user that purports to be a security alert from the user's bank. The email may contain the bank's logo and text that instructs the user to click on a web link. When the user clicks on the web link, the user's browser takes the user to a fraudulent web site 16, which directs the user to upload the user's secret information for an apparently legitimate purpose. To help trick the user, the attacker may use a web site URL for site 16 that looks similar to the URL of trusted web site 14.

As an example, the user may have an account at ABCD Bank. The URL of the legitimate web site 14 associated with ABCD bank may be www.abcdbank.com. In order to effectively trick as many people as possible, the attacker may create a fraudulent web site 16 with a URL of www.abcdbank.com.pqrst.com, where pqrst.com in this example is the first level domain associated with the attacker's fraudulent web site 16. Because the fraudulent URL appears to be associated with ABCD Bank to a casual observer, the user may be misled into believing that the user is at the web site of ABCD Bank and may not realize that the user' browser has in fact taken the user to the web site 16 of the attacker. If the user subsequently follows the instructions provided by the fraudulent web site 16 (e.g., to provide the user's username and password information for an apparently legitimate purpose), the username and password information will be uploaded to the attacker at fraudulent web site 16. The attacker can then use this information to obtain unauthorized access to the user's account at ABCD bank.

To overcome phishing attacks and other social engineering attacks that attempt to trick the user into revealing secret information, the web site verification service 24 of the present invention presents a user who is visiting a given web site with a text box or other on-screen region to type in the name of the organization the user believes should be legitimately associated with the web site. For example, while the user is visiting a web site the user believes is associated with the ABCD Bank, the web site verification service may present a box or other on-screen opportunity to the user into which the user may type the text string "ABCD Bank."

Once the verification service has obtained the user-supplied text "ABCD Bank," the web site verification service may perform a database search on database 20. Using the database search, the service determines which URLs are likely to be legitimately associated with the user-supplied text string "ABCD Bank". The database 20 may include, for example, a list of legitimate institutions and their URLs or may include more general-purpose database content such as a web index constructed by an internet search engine. After the database search has been used to determine which URLs are legitimately associated with the ABCD Bank, the web site verification service may compare the URL of the current web site to the URLs in the results of the database search. If the URL of the web site is contained in the database query results, the URL is probably authentic. For example, if the URL is www.abcdbank.com, the URL will appear in the top 10 results of a web search performed using an internet search engine. If the URL is not contained in the top 10 results, the URL is probably not authentic. A default setting or user-adjusted setting may control how many results are included in the database query results. In the present example, the URL www.abcdbank.pqrs.com would not appear in the top results of a web search performed using the string "ABCD Bank," because none of the legitimate web content that is associated with the ABCD Bank has the URL www.abcdbank.pqrs.com or is associated with any other URL having a first level domain name of pqrs.com.

Figure 2:
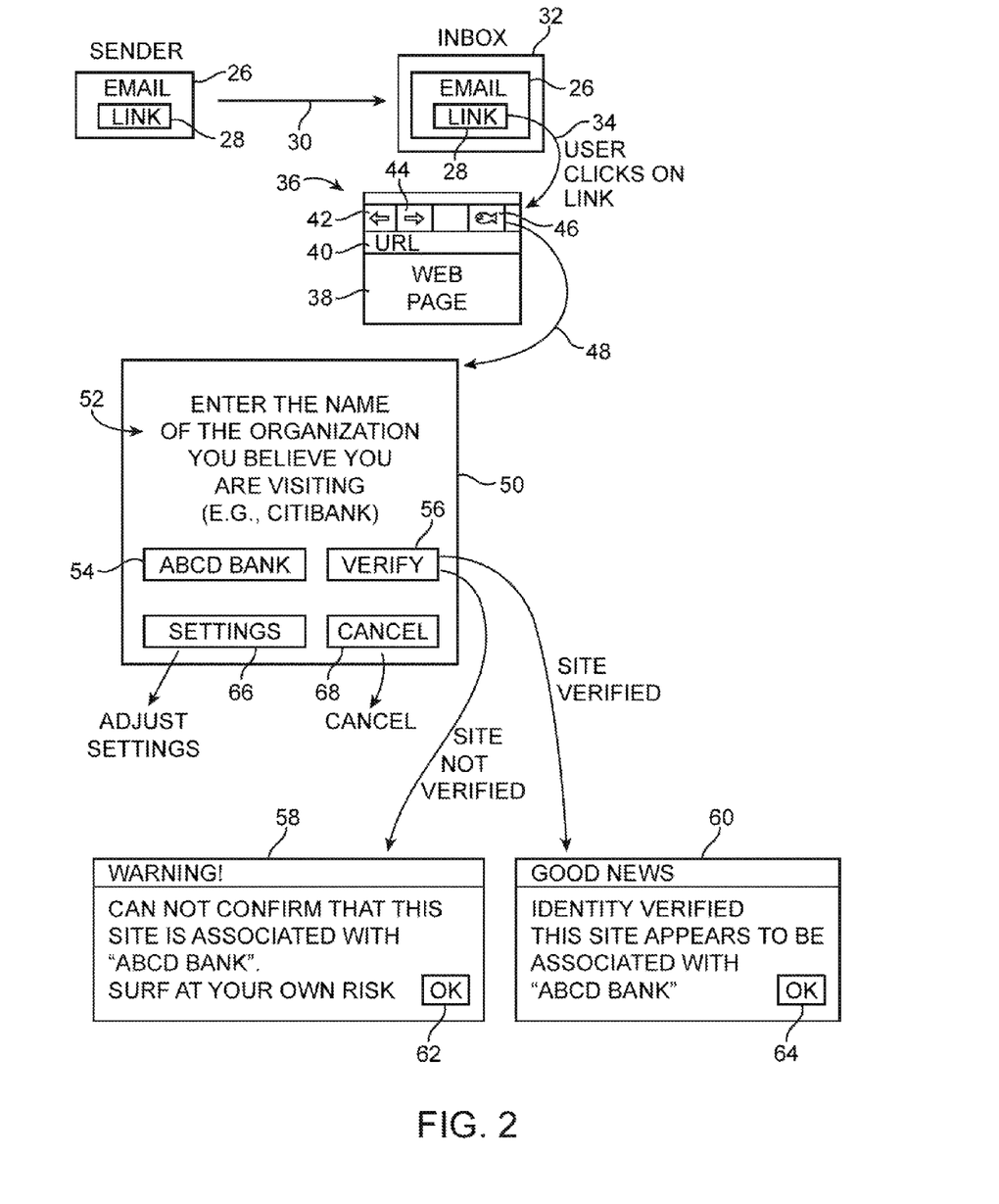
FIG. 2 is a diagram illustrating the operations of an illustrative web site verification service in accordance with the present invention.

Operations involved in verifying a web site's authenticity are shown in FIG. 2. A user may navigate to a web site that needs to be verified using a number of different techniques. For example, a user may type a web address directly into the address bar of a web browser. The user may also navigate to a web site by clicking on web pages links while surfing the internet. In the example of FIG. 2, a sender transmits an email 26 that contains a web link 28 (URL) to the user over the internet, as indicated by line 30.

The email 26 is received by the user's email client and is presented to the user in an inbox 32.

When the user clicks on the link 28 in the received email, the user's web browser is launched, as shown by line 34.

The user's web browser displays a screen such as screen 36. The web page corresponding to the link 28 is presented in region 38. The URL of link 28 is displayed in an address bar such as address bar 40. Screen 36 may include a toolbar region in which navigational buttons such as back and forward arrows 42 and 44 are presented. A selectable on-screen option such as icon 46 may be presented in the toolbar region. As shown by line 48, when the user clicks on icon 46, the web site verification service 24 (FIG. 1) may display a dialog box such as dialog box 50. Box 50 may be displayed as a full-screen or partial-screen overlay on top of screen 36.

Any suitable format may be used for the web site verification service dialog box 50. In the example of FIG. 2, box 50 includes instructions 52 that direct the user to enter a text string corresponding to the name of the entity with which the user believes the current web page in region 38 is associated. Box 50 also includes a text entry box or region 54 which, in conjunction with the instructions 52, prompts the user to enter the text string. In FIG. 2, the user has typed the text string "ABCD Bank" in box 54, because the user believes that the web site displayed in region 38 of screen 36 appears to be related to the financial institution ABCD Bank. The user may believe URL 40 is associated with ABCD Bank because the web page in region 38 contains a logo for ABCD Bank and because some of the text of the URL 40 resembles the bank's name. The user is not certain that the web site is authentic, so the web site verification service is used to check whether the URL in address bar 40 is in fact associated with ABCD Bank.

After the desired user-supplied text string has been entered in box 54, the user may click on verify button 56. In response, the web site verification service uses the user-supplied text "ABCD Bank" to perform a database search to identify which URLs are legitimately associated with the ABCD Bank. The database search may, for example, be performed by passing the text string "ABCD Bank" to an internet search engine using a web services application program interface (API) associated with the search engine. The results, which may be returned to the web site verification service 24 using the web services API, include a list of one or more URLs associated with the text string "ABCD Bank" (e.g., the top 10 search results for "ABCD Bank" that are returned from the internet search engine). The web site verification service 24 compares the URL in region 40 with the URL list from the search results. If there is a match, it can be concluded with reasonable certainty that the web site is authentic. If there is not a match, it can be concluded with reasonable certainty that the web site is not authentic or is at least suspicious.

Web site verification service 24 may display a warning such as warning 58 when the URL in region 40 cannot be authenticated. A notification such as notification 60 may be displayed when the verification operation is successful. Notifications 58 and 60 may be displayed using any suitable format. For example, notifications 58 and 60 may be displayed as windows that are overlaid on top of screen 36 or as icons. Notifications 58 and 60 may have buttons such as OK buttons 62 and 64 that the user can click to remove the notifications. Dialog box 50 can include a settings button 66 that the user can click to access a configuration dialog box in which settings for the web verification service can be adjusted. Cancel button 68 may be used to remove box 50 without performing web site verification operations.

Figure 3A:
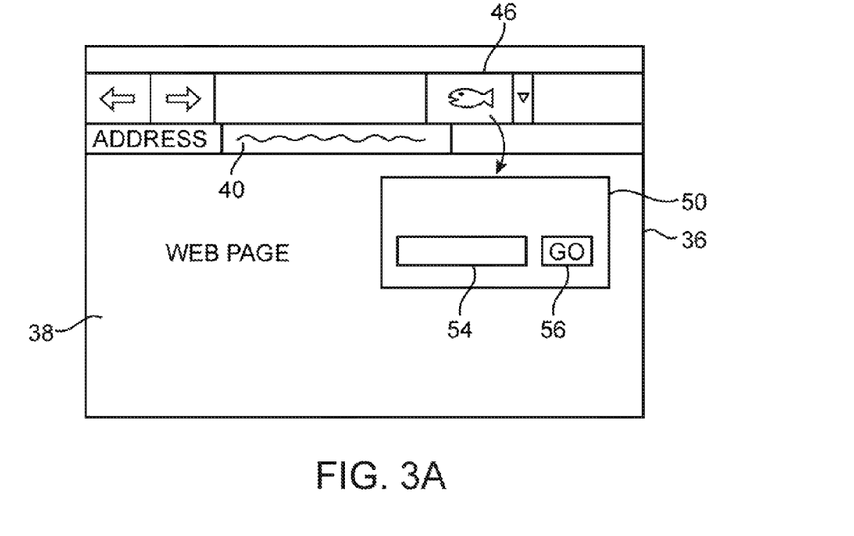
FIG. 3A shows an illustrative icon and dialog box arrangement that may be used in a web site verification service in accordance with the present invention.

The text entry box 54 of FIG. 2 is merely one illustrative arrangement that may be used to gather the text string for the organization or other entity that the user desires to check against the URL 40. Any suitable format may be used by the web site verification service 24 (FIG. 1) to collect the user-supplied text string. Two illustrative text-string collection formats are shown in FIGS. 3A and 3B.

With an arrangement of the type shown in FIG. 3A, an overlay 50 may be displayed on top of screen 36 when the user clicks on an icon 46 on the user's browser toolbar (as discussed in connection with FIG. 2). Text string entry box 54 and button 56 may be used to collect the text string from the user and may be used to initiate the web site verification process.

Figure 3B:
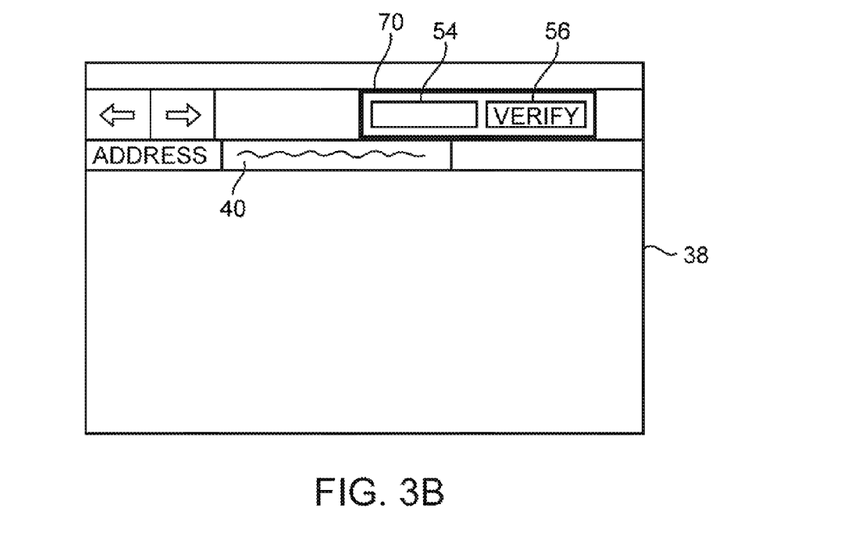
FIG. 3B shows an illustrative text entry toolbar arrangement that may be used in a web site verification service in accordance with the present invention.

With an arrangement of the type shown in FIG. 3B, the text string entry box 54 and activation button 56 are displayed in the browser toolbar in toolbar region 70. Because the text entry box 54 and button 56 are displayed in the browser toolbar, the arrangement of FIG. 3B continuously presents the user with an on-screen opportunity to supply the text string without requiring the user to click on a separate activation icon.

Figure 4:
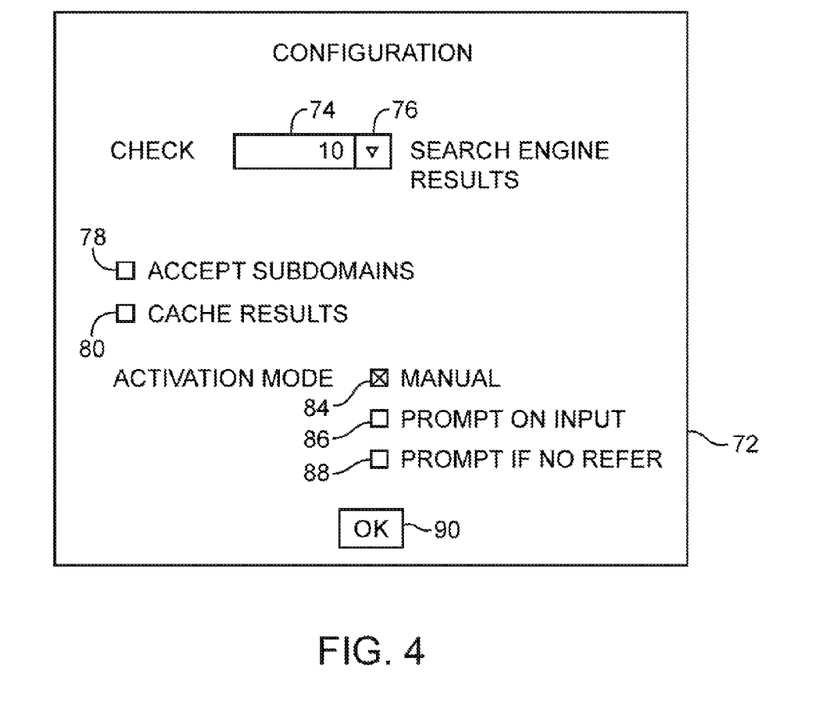
FIG. 4 shows an illustrative dialog box that may be provided to a user of a web site verification service to change settings associated with the service in accordance with the present invention.

FIG. 4 shows an illustrative configuration screen 72 that may be displayed by the verification service 24 to allow the user to adjust settings associated with the verification service. A configuration screen such as screen 72 may be displayed as a full screen or as a partial screen (e.g., as an overlay displayed on top of the web page currently displayed in the user's web browser). Screen 72 may be displayed when, for example, the user clicks on settings option 66 on dialog box 50 of FIG. 2.

As shown in the illustrative configuration screen 72 of FIG. 4, the web site verification service 24 may provide the user with an opportunity to adjust what portion of a search engine's search results are to be compared to the user-supplied text string. The user may type a desired number of search results into box 74 or may click on button 76 to activate a drop-down selection function that can be used to select a number for box 74. In the example of FIG. 4, the user has entered the number "10" into box 74, indicating that the top 10 search engine results obtained when searching the web with the user-supplied text string are to be used as database query results to compare to the unauthenticated URL when verifying whether or not the URL is authentic.

An option such as accept subdomains option 78 may be provided to allow the user to configure how the web site verification service 24 compares the URL to the database query results. By adjusting option 78, the user can dictate whether a "match" when comparing the unauthenticated URL to the URLs in the database query results requires an exact match of the entire domain name (i.e., a complete domain name match) or only requires a match in the first level domain name portion of the URL. In particular, if option 78 is not selected, the verification service 24 will only consider the unauthenticated URL to "match" one of the URLs listed in the database query results in the event that there is a one-to-one correspondence between the unauthenticated URL's entire domain name portion and the entire domain name portion of the URLs in the database query results. If option 78 is selected, the web site verification service 24 will be less restrictive in evaluating whether the unauthenticated URL matches one of the URLs in the database query result and will consider a match to be obtained even if only the first level portion of the domain names match.

As an example, consider a user who has entered the text string "ABCD Bank" because the user believes that the current URL should be associated with ABCD Bank. The web verification service passes the text string "ABCD Bank" to an internet search engine and obtains the 10 most popular hits for "ABCD Bank." The top 10 hits each have an associated URL—i.e., URL1, URL2, etc. In this example, assume URL1 is www.abcdbank.com, URL2 is www.abcdbank.com/main, URL3 is www.login.abcdbank.com, etc. Each of these URLs has a domain name portion of abcdbank.com. (Note that either the full web link www.abcdbank.com or the link portion that does not include the "www" extension—i.e., abcdbank.com may be referred to as a "URL".)

The unauthenticated URL in this example is www.abcdbank.pqrst.com. The top level domain for this URL is ".com" and the first level domain (sometimes referred to as "the domain name" or the "first level domain name") is pqrst.com. In determining whether www.abcdbank.pqrst.com is a valid web site associated with ABCD Bank, the web site verification service 24 compares the unauthenticated URL www.abcdbank.pqrst.com to the list of URLs in the search engine query results (i.e., www.abcdbank.com, www.abcdbank.com/main, and www.login.abcdbank.com . . . ).

When the accept subdomains option 78 has not been selected by the user, the web site verification service 24 seeks a direct match between the entire domain name portion of the query results (i.e., abcdbank.com, login.abcdbank.com, etc.) and the entire domain name portion of the unauthenticated URL (abcdbank.pqrst.com). In this example, these strings do not match, indicating that the URL www.abcdbank.pqrst.com is not an authentic ABCD Bank web site address.

When the accept subdomains option 78 has been selected, the web site verification service 24 is less restrictive in attempting to match the unauthenticated URL and query results and compares the first level domain names (i.e., by comparing pqrst.com to abcdbank.com). This matching mode is less restrictive than when the accept subdomains option is inactive, but in the present example there is still no match between the unauthenticated URL and query results. Selection of option 78 will result in a match if the first level domain name portion of the unauthenticated URL and database query result URLs match. For example, if option 78 is selected, the web site verification service would find a match between the URL "login.ibm.com" (a domain name that includes subdomain information) and the query results domain name "ibm.com," because the first level domain name portion of both of these URLs is ibm.com.

Cache results option 80 may be selected when the user desires to cache the results of the comparisons performed by web site verification service 24. The cache 22 (FIG. 1) may be used to store information on which URLs are authentic and which URLs are fraudulent. The names of the entities associated with the URLs can be included in the cache 22. By consulting cache 22, the web site verification service 24 can sometimes avoid searching database 20, thereby improving the performance of the service.

Other settings may be adjusted if desired. For example, the settings screen 72 may include options such as options 84, 86, and 88 that allow the user to configure how the comparison functions of web site verification service 24 are activated.

If manual option 84 is selected as shown in FIG. 4, the user can direct the verification service 24 to display on-screen options such as text entry box 54 by clicking on an icon such as icon 46 or using another suitable activation mechanism such as a drop down menu option in the user's browser.

If prompt on input option 86 is selected, the web site verification service automatically detects when the user is performing an operation that requires web site verification. For example, when option 86 is selected, the service 24 may display a dialog box such as dialog box 50 of FIG. 2 whenever the service 24 detects that the user is attempting to upload information over the internet using a web form. Because the uploaded information could include sensitive user information such as username and password information, automatic activation and presentation of box 50 in this type of situation may help the user to detect fraudulent sites.

If an option such as prompt if no refer option 88 is selected, the web site verification service 24 automatically detects when the user has submitted a web page request (URL) that does not contain a refer header field. When the refer header field is absent from a web page request, the web site verification service 24 can conclude that the web page request was not made by clicking on a link in an existing web page. Because the web page request was generated without being referred from another page, the web page request may have been generated when the user clicked on an embedded link in an email, such as embedded link 26 in email 28 of FIG. 2. Clicking on an email link such as link 26 is a potentially dangerous situation, because the email message containing the link may be a phishing attack. Selecting the no refer option 88 therefore enhances security by directing the web site verification service 24 to automatically prompt the user to enter a text string for use in web site verification whenever a no refer condition is detected.

When the user has finished adjusting settings, the user may direct the web site verification service 24 to remove the configuration region 72 from the user's computer screen by clicking on OK option 90. If desired, other formats may be used to adjust settings such as drop-down menu options, icons, etc.

Figure 5:
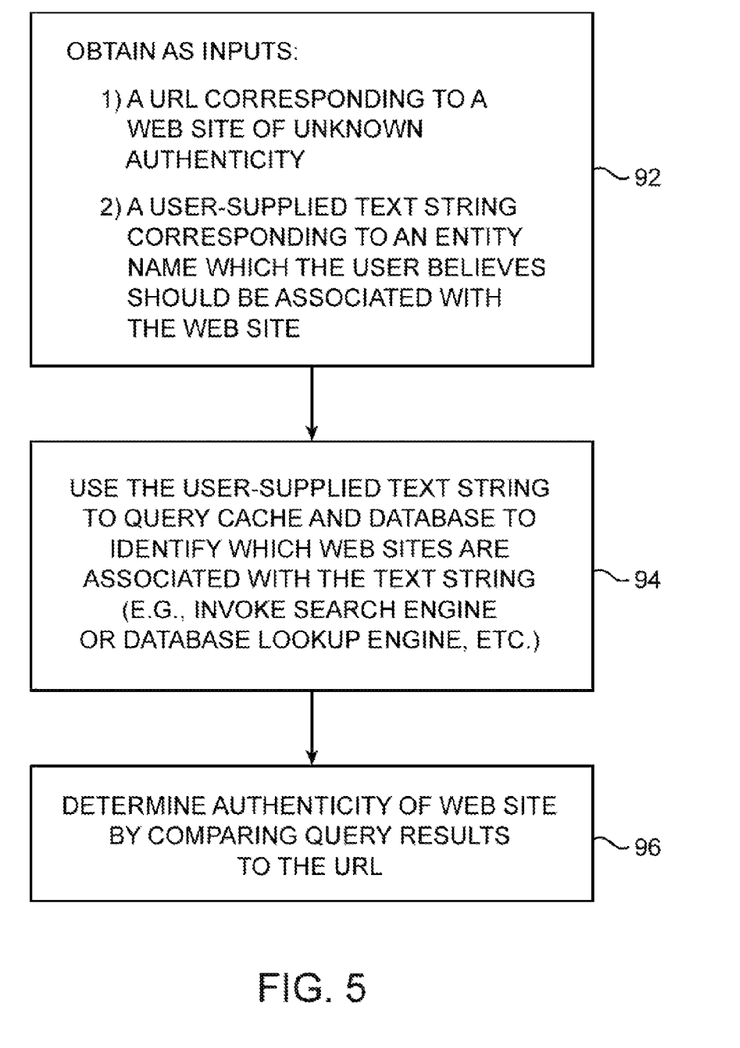
FIG. 5 is a flow chart of illustrative steps involved in determining whether a web site is legitimate in accordance with the present invention.

Illustrative steps involved in using the web site verification service 24 to verify the authenticity of a web site of unknown authenticity are shown in FIG. 5.

At step 92, the verification service obtains two inputs.

The first input is a URL corresponding to a web site of unknown authenticity. This URL may be obtained using the user's web browser (e.g., to capture or otherwise retain the web address that is displayed in a web address region such as URL region 40 of FIG. 2). The URL may have been provided to the user in an email or the user may have browsed to the web site associated with the URL while surfing the internet.

The second input is a user-supplied text string. The text string corresponds to the name of the trusted organization that the user believes should be associated with the web site if that web site is legitimate. For example, if the user believes that the web site is associated with the user's bank, the user supplies the bank name as the text string. The second input may be gathered using a text string entry box 54 or any other suitable user interface.

At step 94, the web site verification service uses the user-supplied text string to search for related web site URLs that are legitimately associated with the trusted organization. The search may involve using a query engine 21 (FIG. 1) to search a database 20. With one suitable approach, the database 20 is a web index database and the query engine 21 is internet search engine. A web services application program interface (API) associated with the internet search engine may be used to pass the user-supplied text string between the software running on computing equipment 12 and a remote query engine 21 at the computing equipment associated with database 20. The API may also be used to provide the results of the search engine database query over network 18. With another suitable approach, the database 20 is formed from a list of web site addresses and entity names of legitimate businesses. The list includes the names of financial institutions and other organizations that frequently handle sensitive user information and corresponding legitimate URLs for those organizations. A combination of these approaches or any other suitable approach may be used for forming database 20. Moreover, the query engine 21 may be implemented on a hardware platform that is remote from computing equipment 12, using local computing equipment 12, or using a combination of local and remote systems.

After performing a database query on database 20 using the user-supplied text string at step 94, the web verification service determines the authenticity of the web site by comparing the query results to the unauthenticated URL at step 96. The specificity of the matching algorithm that is used (i.e., whether entire domain name matches are required or whether first level domain name matches are acceptable) may be adjusted by the user (e.g., using settings such as accept subdomains option 78 of FIG. 4). If the URL matches the query results, the web site is probably authentic, so the user can be notified that the web site has been verified successfully or other suitable action may be taken. If the URL does not match the query results, the user can be warned that the web site cannot be verified.

Previous verification results may be maintained in a cache. The cache may be accessed before searching database 20 to improve performance. The cache may be searched using the URL of the web site of unknown authenticity (e.g., to determine whether that URL has previously been verified). If desired, the user-supplied text string may be used to search the cache (e.g., to help look up which URLs are associated with the trusted entity). Obtaining information from the cache prior to performing the database search and comparison operations of steps 94 and 96 may reduce or eliminate the need for further processing in steps 94 and 96.

Figure 6:
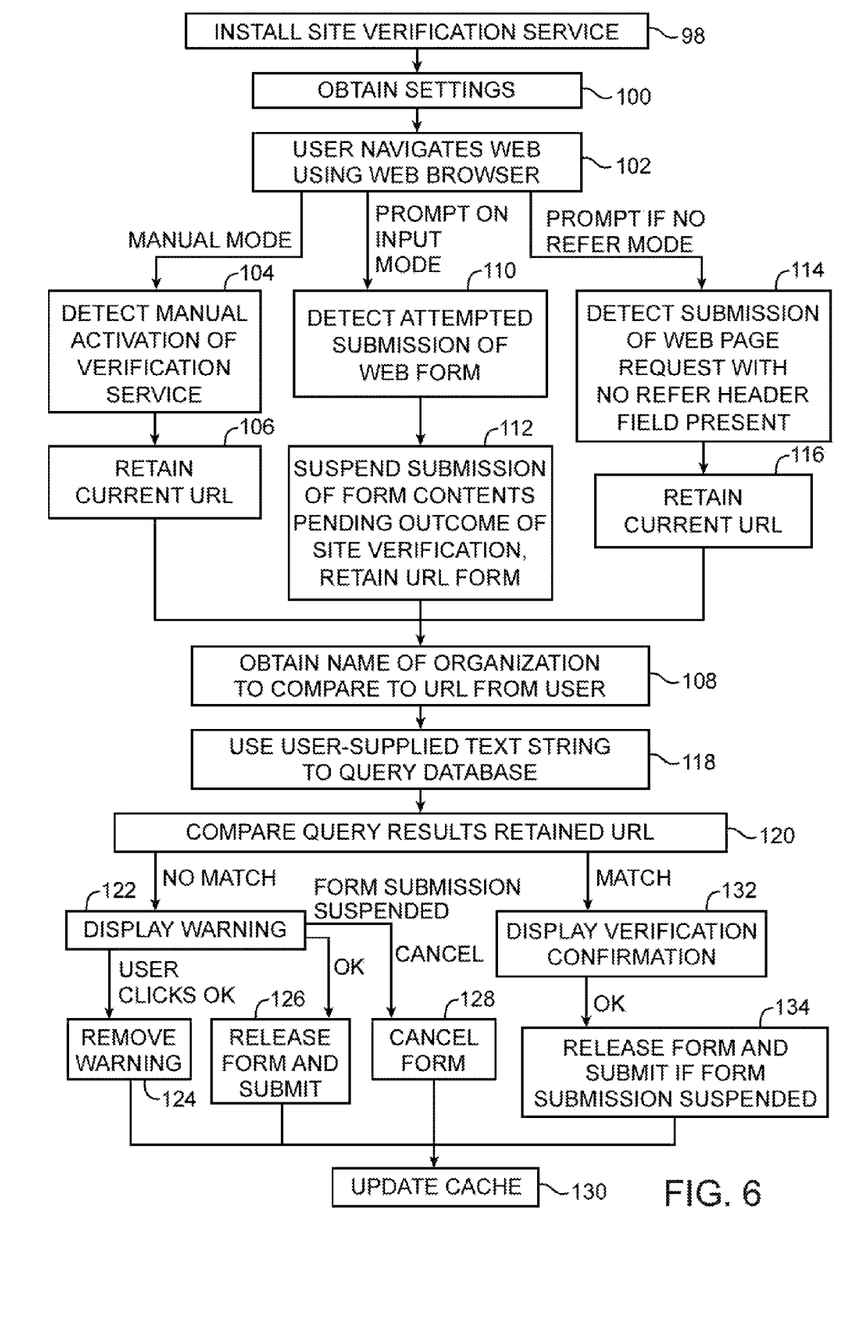
FIG. 6 is a flow chart of illustrative steps involved in verifying the authenticity of a web site by comparing the results of a database query to a URL associated with the website in accordance with the present invention.

Illustrative steps involved in using web site verification service 24 in an environment in which multiple activation modes are used are shown in FIG. 6. At step 98, the web site verification service is installed. The web site verification service may, for example, be installed as part of a web browser or may be installed as a browser plug-in that works with an existing web browser. If desired, web site verification functions may also be provided using a stand-alone application that works separately from a user's web browser. A combination of these arrangements or other suitable arrangements may also be used.

At step 100, a user at computing equipment 12 (FIG. 1) may use the web site verification service 24 to make settings adjustments. Any suitable arrangement may be used to provide the user with an opportunity to supply configuration settings to the web site verification service. For example, a settings screen such as screen 72 of FIG. 4 may be used or a drop-down menu of settings options may be used. If desired, some or all of the settings for the web site verification service may be default settings that are preconfigured for the service without user input.

After the web site verification service 24 has obtained the default and/or user-supplied settings at step 100, the user may use the web browser and site verification service 24 to surf the internet (step 102). The actions taken by the web site verification service to verify a web site address of unknown authenticity after step 102 depend on the operating mode of the service.

If the service 24 has been set to manual mode (e.g., using a manual mode option such as option 84 of FIG. 4), the web site verification service may detect manual activation at step 104. For example, the verification service can detect when the user clicks on a manual activation option such as icon 46 of FIG. 2. When the web site verification service detects that the user is initiating verification operations, the web site verification service retains the current URL for the web site that the user is visiting at step 106 for use in subsequent verification operations. The URL is typically displayed by the web browser in an address bar 40, as shown in FIG. 2.

If the service 24 has been set to prompt on input mode, the web site verification service detects when the user attempts to submit a web form over the internet. Web forms are typically used to collect information such as username and password information, credit card and billing information, etc. Accordingly, the uploading of data to a web site over the internet using a web form is a potentially risky operation. When the prompt on input mode is active, this type of operation is detected automatically at step 110. The web site verification service then suspends the submission of the web form contents at step 112 pending the outcome of the site verification operations to follow. By refraining from submitting the web form at step 112, the site verification service can prevent potentially unwanted disclosure of sensitive user information to a fraudulent web site such as web site 16 of FIG. 1. While submission of the web form is being suspended, the web site verification service 24 retains the URL of the web form's upload location for use in subsequent verification operations.

If the service 24 has been set to prompt if no refer mode, the service automatically detects when a web page request is being submitted by the user that does not contain a refer header field (step 114). When the web page request is made by the user's browser, the service retains the current URL at step 116 for use in subsequent verification operations.

After the current web page's URL has been captured at step 106, 112, or 116, the web site verification service obtains the user-supplied text string at step 108. The web site verification service may, for example, use a text entry box such as box 54 of FIG. 2, 3A, or 3B to obtain a text string from the user. The text string corresponds to the name of the organization that the user believes to be associated with the URL. For example, if the user is visiting a web site that appears to be associated with a particular financial institution (e.g., because the financial institution's logo is displayed), the user is being led to believe that the URL for that site is associated with that financial institution. At step 108, the user may therefore supply the verification service with the name of the financial institution.

At step 118, the user-supplied text string obtained at step 108 is used to query the database 20 (FIG. 1). Database query operations may involve the use of a remote database query engine such as engine 21 of FIG. 1. The type of query operation that is performed at step 118 depends on the type of database 20 that is being used. With one suitable arrangement, the database 20 is an internet search engine database and query engine 21 is an internet search engine. With another suitable arrangement, the database 20 includes a list of trusted web sites and associated institutions and the query engine 21 is a database lookup engine that operates on the list. The results of the database query include a list of trustworthy URLs. In the case of an internet search engine query, the URLs in the search results are believed to be associated with the legitimate organization specified by the user's text string because only the legitimate organization's web pages are likely to have sufficiently high search engine rankings to cause the URLs for those pages to appear as search engine hits. Low ranking hits are preferably not included as part of the search engine database query results. In the case of the database lookup operation performed on a list of trusted organizations and their URLs, the database query results include a specific list of URLs corresponding to trusted entities. The database query results therefore include those URLs that are trusted as belonging to the organization named by the user-supplied text string.

Regardless of the particular type of database that is queried at step 118, at step 120, the results of the database query are compared to the URL that was retained at step 106, 112, or 116. The type of comparison operation that is performed at step 120 may depend on the value of a user-adjustable setting such as the accept subdomains option 78 described in connection with FIG. 4. Comparison operations may involve, for example, seeking a match in only the first level domain name portion of the retained URL and the URLs in the database query results. Alternatively, comparison operations may involve seeking a match between the entire domain name portion of the retained URL and the entire domain name portion of the URLs in the database query results as described in connection with FIG. 4.

If it is determined at step 120 that the retained URL does not match any of the URLs in the database query results, the web site verification service may display a warning for the user at step 122. The warning may inform the user that the service was unable to authenticate the web site. Because the user is warned that the web site does not appear to be associated with the organization with which the user thought it would be associated, the user is less likely to be tricked into submitting sensitive information to a fraudulent site.

The warning that is displayed for the user may be presented as an icon, an overlay, or any other suitable indicator. The warning message may, if desired, include selectable buttons such as an OK button and a cancel button. If the user clicks on an OK button in the warning, the web site verification service 24 may remove the warning at step 124 and allow the user to continue browsing the web. If the web site verification service had suspended submission of a web form by the user at step 112, clicking the OK button will direct the service to release the form and remove the warning so that the form contents are uploaded over the internet (step 126). If form submission had been suspended at step 112 and the user clicks on the cancel button, the warning is removed and the form submission process is cancelled so that the user's potentially sensitive information is not uploaded (step 128).

If it is determined at step 120 that the retained URL matches a URL in the database query results, the web site verification service may display a confirmation notification (e.g., "good news") to inform the user that web site has been authenticated (step 132). The verification confirmation may be displayed using a screen overlay or any other suitable arrangement. The verification confirmation may include an OK button. If the user clicks on the OK button, the web site verification service can remove the verification confirmation from the user's screen, so that the user can continue to browse the web. If the web site verification service had detected the attempted submission of a web form at step 110 and had suspended the submission of the web form at step 112, the suspension can be lifted at step 134 and the web form submitted. When the suspension of the submission process is ended at step 134, the contents of the web form are uploaded to their intended destination (e.g., a trusted web site 14).

If desired, the web site verification service can maintain a cache 22 (FIG. 1). Both positive and negative results from the comparison operations performed at step 120 may be retained in the cache. If, for example, a web site URL is determined to be associated with a trusted party, the URL and the name of the trusted party may be stored in the cache. If a web site URL cannot be verified, this information can also be stored in the cache. The process of updating the cache is illustrated schematically by step 130 in FIG. 6. Cache updating may be performed whenever web site verification service 24 obtains new verification information.

Figure 7:
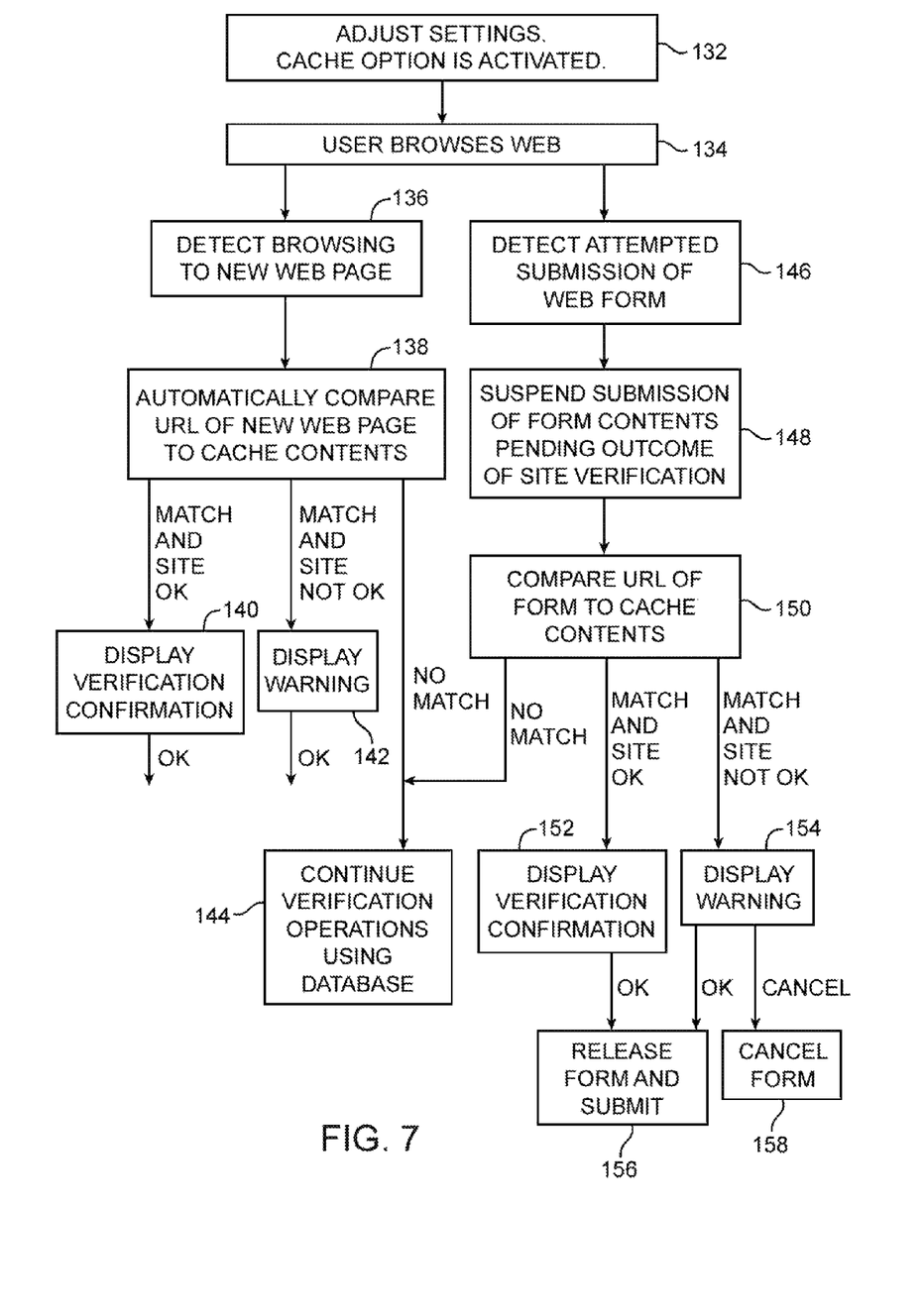
FIG. 7 is a flow chart of illustrative steps involved in verifying the authenticity of a web site using the contents of a cache in accordance with the present invention.

Illustrative steps involved in using system 10 when the web site verification service consults the cache 22 during verification operations are shown in FIG. 7.

At step 132 of FIG. 7, the user is allowed to adjust settings for the web site verification service 24 (e.g., using a configuration screen such as screen 72 of FIG. 4). An option such as option 80 may be used to activate caching. If desired, web site verification service 24 may maintain a cache of verification results as a default.

At step 134, the user's web browser is used to display web pages for the user on the user's computing equipment 12. The user may click on web page links to navigate the web or may type web addresses into an address field in the user's web browser. If the user receives an email with an embedded link, the user may click on the embedded link to access a web page. The user may attempt to upload sensitive user data to a website of unknown authenticity by entering data and clinking on an on-screen button (e.g., a "login" button, a "buy" button, etc.) in a web form.

Step 136 illustrates how the web site verification service 24 may automatically detect when the user is browsing to a new web page. Step 146 illustrates how the web site verification service 24 may detect when the user attempts to upload data over communications network 18 using a web form.

If the verification service detects that the user has browsed to a new web page at step 136, the verification service retains the URL of the web page and automatically compares the retained URL to the URLs in cache 22. The degree of specificity required during comparison step 138 may depend on which default or user-selected comparison mode is in effect. For example, if the accept subdomains option 78 of FIG. 4 was selected by the user at step 132, the comparison operation of step 138 will allow for matches in the first level domain name portion of the URLs. If the accept subdomains option 78 of FIG. 4 was not selected by the user at step 132, the comparison operation of step 138 will require a match of the entire domain name portion of the retained URL and the cached URL.

If the URL of the current web page matches one of the URLs in the cache 22 and the information in the cache indicates that the web site belongs to a trusted entity, the web site verification service may display a verification confirmation for the user at step 140. The verification confirmation may include an OK button. When the user clicks on the OK button, the verification confirmation is removed from the user's screen so the user can continue web browsing.

If the URL of the current web page matches one of the URLs in the cache 22 and the information in the cache indicates that the URL is associated with an untrusted web site (e.g., site 16 of FIG. 1), the verification service warns the user. Any suitable arrangement may be used to warn the user that the verification service is unable to verify the URL. For example, a warning screen may be displayed for the user at step 142. The warning screen may contain an OK button. When the user clicks the OK button, the warning screen is removed.

If the comparison operations of step 138 reveal that the retained URL is not contained in the cache 22, the web site verification service 24 can perform the database search and comparison operations of FIG. 6 to attempt to verify the URL. These operations are depicted as step 144 in FIG. 7.

When the user is browsing the web at step 134, the user may decide to submit information to a web site of unknown authenticity. If the user clicks on a button on a web page (form) that initiates the uploading of potentially sensitive user information, the web site verification service 24 will automatically detect the attempted submission of the form at step 146, provided that the default or user-selected verification service settings (e.g., prompt on input setting 86) are adjusted to allow automatic detection of an attempted web form submission.

When an attempted web form submission is detected at step 146, the web site verification service suspends submission of the form at step 148, pending the outcome of the site verification process. The URL of the web form is retained by the service to compare against the cache 22.

At step 150, the service compares the retained URL against the cache contents.

If the URL is located in the cache at step 150 and the information in the cache indicates that the URL is trusted, the service may display a verification confirmation for the user at step 152. If the user clicks OK in the verification confirmation screen, the verification confirmation is removed and the suspended web form is submitted at step 156.

If the URL is located in the cache at step 150 and the information in the cache indicates that the URL is not trusted, the verification service displays a warning for the user at step 154. The warning may contain OK and cancel buttons. If the user clicks on the cancel button, the web form is not submitted (i.e., the form submission process is cancelled), as shown by step 158. If the user clicks on the OK button, the warning is removed and the verification service allows the previously-suspended submission of the web form to be submitted (step 156).

If the URL is not located in the cache during the comparison of step 150, the web site verification service 24 can perform the database search and comparison operations of FIG. 6 to attempt to verify the URL (shown by step 144 of FIG. 7).

The foregoing is merely illustrative of the principles of this invention and various modifications can be made by those skilled in the art without departing from the scope and spirit of the invention.

What is claimed is:

1. A method for using a computer-implemented web-site verification service to verify whether or not certain web sites and their universal resource locators (URLs) are associated with trusted entities, comprising:
as a user browses the world wide web using computing equipment, retaining a URL for a web site of unknown authenticity using the computing equipment;
presenting an on-screen opportunity on the computing equipment for the user to supply the web site verification service with a text string naming which trusted entity the user believes should be associated with the web site of unknown authenticity;
after the user supplies the text string, using the user-supplied text string to query a database with the computing equipment to produce database query results that identify which URLs are legitimately associated with the text string; and
with the computing equipment comparing the retained URL to the database query results to determine whether the web site of unknown authenticity is associated with the trusted entity.

2. The method defined in claim 1 wherein presenting the on-screen opportunity for the user to supply the text string comprises displaying a box with the computing equipment into which the user types the text string and a button that the user clicks to initiate verification operations using the text string in the box.

3. The method defined in claim 1 wherein using the user-supplied text string to query the database comprises using an Internet search engine to query the database with the user-supplied text string.

4. The method defined in claim 1 wherein the database comprises a list of trusted organizations and associated URLs and wherein using the user-supplied text string to query the database comprises using a database lookup operation with the user-supplied text string to identity URLs associated with the trusted organizations.

5. The method defined in claim 1 further comprising displaying an icon in a web browser toolbar that the user clicks to direct the web site verification service to present an on-screen box into which the text string is typed by the user.

6. The method defined in claim 1 further comprising:
using the web site verification service to automatically detect when the user navigates to a web page using a web page request that contains no refer field header; and
when the web site verification service detects that the user has navigated to a web page using a web page request that contains no refer field header, automatically presenting the on-screen opportunity for the user to supply the web site verification service with the text string.

7. The method defined in claim 1 further comprising:
using the web site verification service to automatically detect when the user is attempting to upload information to the web site of unknown authenticity; and
when the web site verification service detects that the user is attempting to upload information to the web site of unknown authenticity, automatically presenting the on-screen opportunity for the user to supply the web site verification service with the text string.

8. The method defined in claim 1 further comprising:
displaying an on-screen confirmation message for the user when comparison of the retained URL to the database query results produces a match indicating that the web site is associated with the trusted entity.

9. The method defined in claim 1 further comprising:
displaying an on-screen warning message for the user when comparison of the retained URL to the database query results produces no match.

10. The method defined in claim 1 further comprising:
using the web site verification service to automatically detect when the user is attempting to upload information to the web site of unknown authenticity by submitting a web form; and
when the web site verification service detects that the user is attempting to upload the information by submitting the web form, suspending submission of the web form pending verification of whether the web site of unknown authenticity is associated with the trusted entity.

11. The method defined in claim 1 further comprising:
using the web site verification service to automatically detect when the user is attempting to upload information to the web site of unknown authenticity by submitting a web form;
when the web site verification service detects that the user is attempting to upload the information by submitting the web form, suspending submission of the web form pending verification of whether the web site of unknown authenticity is associated with the trusted entity; and
when the web site verification service determines that the web site is associated with the trusted entity, lifting the suspension of the submission of the web form to upload the information to the web site.

12. The method defined in claim 1 further comprising:
presenting the user with on-screen options that allow the user to adjust configuration settings for the web site verification service, wherein the configuration settings include a setting indicating how many database query results are used in determining whether the web site of unknown authenticity is associated with the trusted entity.

13. The method defined in claim 1 further comprising:
presenting the user with on-screen options that allow the user to adjust configuration settings for the web site verification service, wherein the configuration settings indicate whether a match when comparing the retained URL to the database query results requires an entire domain name match or requires only a first level domain name match.

14. The method defined in claim 1 further comprising:
presenting the user with on-screen options that allow the user to adjust whether the web site verification service presents the on-screen opportunity to the user when the user clicks on an icon or whether the web site verification service presents the on-screen opportunity to the user automatically when an attempted web form submission is made or when a web page request without a refer field header is made.

15. The method defined in claim 1 wherein presenting the user with the on-screen opportunity comprises displaying a text string entry box in a toolbar region of a web browser into which the user types the text string.

16. The method defined in claim 1 wherein presenting the user with the on-screen opportunity comprises displaying an on-screen text string entry box in a partial-screen dialog box when a user clicks on a web browser toolbar icon.

17. The method defined in claim 1 further comprising:
maintaining a cache containing information on comparisons between retained URLs and database query results; and
using the web site verification service to consult the cache during web site verification operations.

* * * * *